United States Patent
Wada et al.

(10) Patent No.: US 9,683,603 B2
(45) Date of Patent: Jun. 20, 2017

(54) METHOD FOR PRODUCING SLIDING MEMBER, SLIDING MEMBER, AND SUBSTRATE MATERIAL OF SLIDING MEMBER

(75) Inventors: Hitoshi Wada, Toyota (JP); Shigeyuki Suga, Toyota (JP); Takashi Tomikawa, Toyota (JP)

(73) Assignee: TAIHO KOGYO CO., LTD., Aichi (JP)

( * ) Notice: Subject to any disclaimer, the term of this patent is extended or adjusted under 35 U.S.C. 154(b) by 849 days.

(21) Appl. No.: 12/992,180

(22) PCT Filed: May 14, 2009

(86) PCT No.: PCT/JP2009/058993
§ 371 (c)(1),
(2), (4) Date: Feb. 8, 2011

(87) PCT Pub. No.: WO2009/139440
PCT Pub. Date: Nov. 19, 2009

(65) Prior Publication Data
US 2011/0124535 A1    May 26, 2011

(30) Foreign Application Priority Data
May 15, 2008  (JP) .................... 2008-128920

(51) Int. Cl.
*C23C 28/00* (2006.01)
*C23C 28/02* (2006.01)
(Continued)

(52) U.S. Cl.
CPC ................ *F16C 33/12* (2013.01); *C25D 3/54* (2013.01); *C25D 5/10* (2013.01); *C25D 7/10* (2013.01);
(Continued)

(58) Field of Classification Search
CPC ... C25D 5/10; C25D 5/12; C25D 5/48; C25D 7/10; C25D 11/02; C25D 11/34;
(Continued)

(56) References Cited

U.S. PATENT DOCUMENTS 3,988,217 A * 10/1976 Ikegaya ........................ 205/50
4,394,232 A *  7/1983 Exalto et al. ................ 205/706
(Continued)

FOREIGN PATENT DOCUMENTS

DE      GB 2438977 A * 12/2007  ............ B32B 15/01
EP       2 275 590 B1    8/2015
(Continued)

OTHER PUBLICATIONS

Notification Concerning Transmittal of International Preliminary Report on Patentability (Form PCT/IB/326 of International Application No. PCT/JP2009/058993 mailed Nov. 25, 2010 with Forms PCT/IB/373 and PCT/ISA/237.
(Continued)

*Primary Examiner* — Edna Wong
(74) *Attorney, Agent, or Firm* — Westerman, Hattori, Daniels & Adrian, LLP

(57) ABSTRACT

In a method, in which a plain bearing alloy layer is bonded to a surface of a backing steel sheet, and, a Bi-based overlay layer is then deposited on the plain bearing alloy layer by electroplating, replacement of Bi with the backing steel sheet and deposition of Bi on the backing steel sheet are prevented. Prior to the step of electroplating of the Bi-based overlay layer, the following metals and the like are formed on at least the back surface of the backing steel sheet. An electrochemically more noble metal than Bi, an electrochemically more base metal than Bi and capable of forming a passivation state, or resin.

9 Claims, 1 Drawing Sheet

(51) Int. Cl.
*F16C 33/12* (2006.01)
*C25D 3/54* (2006.01)
*C25D 5/10* (2006.01)
*C25D 7/10* (2006.01)
*C25D 11/04* (2006.01)
*C25D 11/26* (2006.01)
*F16C 33/14* (2006.01)

(52) U.S. Cl.
CPC .............. *C25D 11/04* (2013.01); *C25D 11/26* (2013.01); *F16C 33/122* (2013.01); *F16C 33/14* (2013.01); *F16C 2204/20* (2013.01); *F16C 2204/36* (2013.01); *F16C 2223/70* (2013.01); *Y10T 428/12569* (2015.01); *Y10T 428/12972* (2015.01)

(58) Field of Classification Search
CPC ......... C23C 28/00; C23C 28/02; F16C 33/12; F16C 33/14; F16C 33/122; F16C 33/124; F16C 33/125; F16C 33/127
USPC .................................................. 205/183, 184
See application file for complete search history.

(56) References Cited

U.S. PATENT DOCUMENTS

| | | | |
|---|---|---|---|
| 4,836,695 A | * | 6/1989 | Baureis et al. ............... 384/276 |
| 5,413,875 A | | 5/1995 | Tanaka et al. |
| 5,770,323 A | | 6/1998 | Johal et al. |
| 6,309,759 B1 | | 10/2001 | Tomikawa et al. |
| 6,575,635 B1 | | 6/2003 | Tsuji et al. |
| 7,063,897 B2 | | 6/2006 | Kawachi et al. |
| 7,128,981 B2 | | 10/2006 | Kawachi et al. |
| 2002/0164098 A1 | * | 11/2002 | Takayanagi et al. ......... 384/294 |
| 2004/0241489 A1 | | 12/2004 | Kawachi et al. |
| 2007/0269147 A1 | | 11/2007 | Rumpf |

FOREIGN PATENT DOCUMENTS

| | | | | |
|---|---|---|---|---|
| GB | 2402135 A | * | 12/2004 | .............. F16C 33/12 |
| GB | 2 438 977 A | | 12/2007 | |
| JP | 60088946 A | * | 5/1985 | .............. G03F 1/00 |
| JP | 60-200974 A | | 10/1985 | |
| JP | 61088020 A | * | 5/1986 | .............. F16C 33/08 |
| JP | 04282013 A | * | 10/1992 | ................ F16C 9/04 |
| JP | 6-017282 A | | 1/1994 | |
| JP | 06017282 A | * | 1/1994 | .............. C25D 5/26 |
| JP | 07259870 A | * | 10/1995 | .............. F16C 35/02 |
| JP | 2525538 B2 | | 8/1996 | |
| JP | 2001-020955 A | | 1/2001 | |
| JP | 3463809 B2 | | 11/2003 | |
| JP | 2004-308883 A | | 11/2004 | |
| JP | 2004-353042 A | | 12/2004 | |
| JP | GB 2402135 A | * | 12/2004 | ........... B32B 15/012 |
| JP | 2005-264179 A | | 9/2005 | |
| JP | 3693256 B2 | | 9/2005 | |
| SU | 896078 B | * | 1/1982 | .............. C25D 5/38 |

OTHER PUBLICATIONS

Notification of Transmittal of Translation of the International Preliminary Report on Patentability ( Form PCT/IB/388) of International Appllication No. PCT/JP2009/058993 mailed Jan. 20, 2011 with Forms PCT/IB/373 and PCT/ISA/237.
Translation of the International Search Report for PCT/JP2009/058993 submitted with IDS filed Nov. 11, 2010.
International Search Report of PCT/JP2009/058993, mailing date Aug. 18, 2009.

* cited by examiner

METHOD FOR PRODUCING SLIDING MEMBER, SLIDING MEMBER, AND SUBSTRATE MATERIAL OF SLIDING MEMBER

TECHNICAL FIELD

The present invention relates to a method for producing a sliding member. More particularly, the present invention relates to a method for producing a sliding member having a plain bearing alloy layer and a Bi-based overlay layer, which are successively laminated on a backing steel sheet. Furthermore, the present invention relates to a sliding member having a novel laminated structure and a substrate material of the sliding member.

BACKGROUND TECHNIQUE

A plain bearing, which is a representative sliding member, has a structure in which a bearing-alloy layer consisting of copper alloy or aluminum alloy and referred to as a lining and an overlay layer consisting of a soft metal are laminated on a backing steel sheet. The soft-metal overlay is utilized as a compatibility layer, and is deposited on the plain bearing-alloy layer usually by electroplating. As is shown in FIG. 1 of Patent Document 1 (Japanese Patent No. 3463809), the bearing parts as a whole are immersed in the plating liquor so as to electrolytically precipitate a Pb-based overlay on the plain bearing alloy.

Conventionally, a Pb-based alloy has been usually used for producing an overlay layer. However, since Pb is environment-polluting material, a Bi-based overlay has been proposed. That is, Pb is replaced with Bi.

For example, Patent Document 2 (Japanese Unexamined Patent Publication (kokai) No. 2004-308883) proposes a sliding member having the above-described laminated structure. That is, a plain bearing alloy used is Cu or Al-based alloy, and a Bi or Bi-alloy plated layer is used for an overlay layer. This Bi or Bi-alloy plated layer is texture controlled by the PR electrolytic method such that an orientation index of (202) plane amounts to 30% or more and amounts to the highest value as compared with the other planes.

According to Patent Document 3 (Japanese Patent No. 3693256), a plain-bearing Cu or Al alloy layer is formed on a backing metal of a steel sheet, and then a Bi—Cu based overlay layer is formed by PR electrolytic plating.

PRIOR ART DOCUMENTS

Patent Documents

Patent Document 1: Japanese Patent No. 3463809
Patent Document 2: Japanese Unexamined Patent Publication (kokai) No. 2004-308883
Patent Document 3: Japanese Patent No. 3693256
Patent Document 4: Japanese Patent No. 2525538
Patent Document 5: Japanese Unexamined Patent Publication (kokai) No. 2005-264179

SUMMARY OF INVENTION

Problems to be Solved by Invention

As is described hereinabove, when an overlay layer of soft metal is deposited by electroplating, the substrate material of a plain bearing as a whole is immersed in the plating liquor, in which ionized soft metal is contained. When the Pb-based overlay layer is deposited by electroplating, although the backing steel sheet is an electrically good conductor, the Pb based overlay layer neither substitutes for Fe nor precipitate on Fe, because potential difference between Fe and Pb is small.

Meanwhile, the present inventors discovered the following phenomena in a case of electrolytic deposition of a Bi-based overlay layer. That is, Bi ions in the plating liquor, which are electrochemically noble as compared to Fe, substitute for Fe of a backing steel sheet and precipitate on its back surface exposed in the plating liquor. The substituting deposited Bi is brittle. A backing steel sheet dissolves to yield Fe ions and these Fe ions in turn are electrolytically deposited on the backing steel sheet, thereby forming a brittle coating. In the above-described procedure, a Bi plating coating is once formed on the back surface of a backing metal, but the subsequently deposited Bi plating coating or the again precipitated Fe coating easily separate from the backing metal. At the end of the plating procedure, the back surface of the backing steel sheet is free of Bi-based alloy. It turned out, as a result of precise observation on the back surface of backing metal, that it has undergone total corrosion and surface roughening (minute unevenness). The back surface of a backing steel sheet of an engine bearing is brought into collision against or slides on the large or small end of a connecting rod. Therefore, the back surface of a backing steel sheet with surface roughening (minute unevenness) as described hereinabove, involves a danger of fatigue destruction of an engine bearing.

It is, therefore, an object of the present invention to provide a plain bearing having a basic structure including a backing steel sheet, a Cu- or Al-based plain bearing layer, and an electroplated Bi-based overlay layer, with which sliding failure attributed to the back surface of the backing metal is technically prevented.

Means for Solving a Problem

There are provided the following inventions.
(1) A method for producing a sliding member, wherein a plain bearing alloy layer is bonded to a surface of a backing steel sheet, and a Bi-based overlay layer is then deposited on the plain bearing alloy layer (which may be referred to as "a lining") by electroplating, characterized in that, prior to the step of electroplating said Bi-based overlay layer, a first protecting layer consisting of an electrochemically more noble metal than Bi (hereinafter abbreviated as "noble metal"), an electrochemically more base metal than Bi and capable of forming a passivation state on a surface thereof (hereinafter abbreviated as "base metal"), or resin, is formed on the back surface of said backing steel sheet, and further, when the first protecting layer consisting of a base metal, that is, the surface of the first protecting layer opposite the backing steel sheet, is passivated.
(2) A method for producing a sliding member according to (1), characterized in that a second protecting layer consisting of a noble metal or a base metal is provided on the surface of the backing steel sheet.
(3) A method for producing a sliding member according to (2), wherein the first protecting layer and the second protecting layer consist of identical material.
(4) A substrate material of a sliding member used for electroplating a Bi-based overlay layer, comprising: a first protecting layer consisting of electrochemically more noble metal than Bi (hereinafter abbreviated as "noble metal"), an electrochemically more base metal than Bi and capable of forming a passivation state on a surface thereof (hereinafter abbreviated as "base metal"), or resin, formed on the back surface of a backing steel sheet; said plain bearing alloy layer being bonded to the top surface of a backing steel sheet, wherein when said first protecting layer consisting of a base metal, the surface of the first protecting layer opposite the backing metal is passivated.

(5) A sliding member substrate material according to (4), characterized in that a second protecting layer consisting of noble metal or base metal is interposed between the backing steel sheet and the plain bearing alloy layer.

(6) A sliding member, which comprises a backing steel sheet, a plain bearing alloy layer bonded to the top surface side of said backing steel sheet, an electroplated Bi-based overlay layer deposited on the top surface of the plain bearing alloy layer, and a first protecting layer consisting of noble metal, base metal or resin and deposited on the back surface of said backing steel sheet, characterized in that the sliding member is produced by any one of the methods (1) through (3), and, further a constituent material of the Bi based overlay neither substitutes for the Bi-based overlay layer nor deposits on the Bi-based overlay layer.

(7) A sliding member according to (6), characterized in that a second protecting layer consisting of a noble metal or a base metal is present between the backing steel sheet and the plain bearing alloy layer.

The common features of the present inventions (1) through (7) are first described. The essential structure of a plain bearing includes a backing steel sheet, a Cu based or Al based plain bearing alloy layer, and a Bi-based overlay layer. Such a plain bearing is known per se. Among them, a backing steel sheet is typically a mild steel sheet, such as SPCC. A special backing steel sheet is a high-strength backing metal described in Patent Document No. 3, Japanese Patent No. 2525538 and having a relatively high carbon content. Another special backing steel sheet is nitrogen-added steel described in Patent Document No. 4, Japanese Unexamined Patent Publication (kokai) No. 2005-264179. These special backing steel sheets may be used.

The Cu-based plain bearing alloy generally contains 1 to 15 mass % Sn as an essential component of bronze. If necessary, the Cu-based plain bearing alloy furthermore contains 1 to 15 mass % of compatibility components such as Pb and Bi, 1 to 5 mass % of strengthening element, such as Ni, Ag, Al, Sb, and 1 to 15 mass % of In as a corrosion resistant element. The Cu-based plain bearing alloy in the form of Cu-alloy powder is sprayed on a backing steel sheet, and is sintered at a temperature of 650 to 1000 degrees C. in a reducing protective atmosphere (such as hydrogen gas, or a gas mixture of hydrogen and nitrogen), whereby a lining is provided.

A standard electrode potential of Cu (with the proviso that a standard hydrogen electrode represents 0 V, the same applies hereinbelow) is Cu=+0.337 V. The reaction $Bi=Bi^{3+}+3e^-$ presents a standard electrode potential of +0.22 V (25 degrees C.), which means that Cu is electrochemically more noble than Bi. The above values provide a standard electrode potential of Cu-based plain bearing alloy, with variation around the above values.

An Al-based plain bearing alloy generally contains 1 to 35 mass % of a soft component such as Sn and Pb, and, contains, if necessary, 1 to 8 mass % of Si as a wear-resistance enhancing component, and 0 to 3 mass % of Cu, Mg, Cr, Fe, Zr, Mn, V, and the like as a strengthening component. The Al-based plain bearing alloy in the form of a rolled sheet is pressure-bonded to the backing metal, to provide a lining. The standard electrode potential of the Al-based plain bearing alloy is determined by the reaction $Al=Al^{3+}+3e^-$, which presents a standard electrode potential of −1.66 V. Therefore, Bi is electrochemically more noble than Al.

Meanwhile, Cr, Ni and Al are more base than Bi. When electroplated Cr, Ni and Al are allowed to stand at room temperature after electroplating, they are converted to a state known as passivation; i.e., $Cr_2O_3$, NiO, and $Al_2O_3$, respectively. When such more base and passivated metal is present on at least a surface of a backing steel sheet, Bi neither substitutes for the passivation surface nor deposits on the passivated surface, during electroplating of a Bi-based overlay.

Pure Bi, and a Bi alloy containing up to 20 mass % of an alloying element can be used for forming a Bi-based overlay layer. As known from Patent Document 3, Bi alloy contains Cu as an alloying element. Since In, Zn, Ag and the like have the same degree of hardness as Bi, the Bi-based overlay with these alloying elements fundamentally maintains the compatibility inherent to Bi.

Next, a production method according to the invention (1) is described. In the present invention, the following known steps are successively carried out. A plain bearing alloy layer is bonded to the top surface of a backing steel sheet by rolling or sintering. Subsequently, a Bi-based overlay layer is deposited on the plain bearing alloy layer by electroplating. The present invention is characterized in that a protecting layer is formed, during the steps mentioned above but prior to the electroplating of a Bi based overlay layer, on at least the back surface of a backing steel sheet. The protecting layer consisting of an electrochemically more noble metal than Bi (namely "noble metal"), a metal electrochemically more base than Bi and capable of passivating (namely "base metal"), or resin.

A conventional Pb-based overlay does not have any particular problems, because Pb does not precipitate on the Fe based backing metal during electroplating of an overlay. Contrary to this, such phenomena as described in Paragraph 0007 occur when a Bi based overlay layer is electroplated. The present inventors discovered that, in order to prevent this problem, a protecting layer must be provided, unlike the case of a conventional structure of a plain bearing that does not have any protecting layer. Bi (alloy) of the Bi based overlay layer substitutes for and deposits on the protecting layer consisting of more base metal than Bi of overlay layer. In this case, Bi (alloy) of the Bi based overlay precipitates on the protecting layer. However, when the protecting layer is passivated, neither substitution nor deposition occur. That is, when the passivated base metallic material or resin coating is present on the back side of a backing metal, neither substitution nor precipitation of Bi (alloy) occur on the passivated surface. However, an electrode should be brought into contact with a work piece (a substrate material of sliding member) at a portion where the passivation film or resin film is absent.

The method of the present invention (2), the substrate material of the present invention (5), and the sliding member of the present invention (7) are characterized in that a second protecting layer consisting of the base metal or noble metal is formed on the top surface side of a backing steel sheet, in addition to the first protecting layer mentioned above. Subsequently such substrate material of a sliding member is used to electroplate the Bi based overlay layer. When the first and second protecting layers are made of the same material, both layers can be simultaneously formed (the method (3) mentioned hereinabove).

A lining is formed on the passivation film on the second protecting layer. Thus, the passivation film is positioned beneath the lining. When the Bi-based overlay layer is to be provided through electroplating, an electrode should be attached on the substrate material of a sliding member. The passivated film beneath the lining makes attachment of the electrode on the substrate material complicated. Specifically, the sliding member may be sandwiched by electrodes at its both sides to attach an electrode. This electrode attaching method involves a risk of current conduction failure. Therefore, it is preferred that, prior to electroplating of a Bi-based overlay layer, the passivation layer on the second protecting layer is removed by pickling or the like. When the second protecting layer consisting of Ni or Cr, and the lining is of a copper alloy, the passivation layer is chemically reduced in a reducing sintering atmosphere and will disappear.

A substrate material of the sliding member (4) used for depositing a Bi-based overlay layer on the plain-bearing alloy layer by electroplating comprises: a backing steel sheet; a protecting layer formed on the back surface of the backing metal and consisting of a noble metal, base metal, or resin; and a plain-bearing alloy layer bonded to the top surface of a backing steel sheet, wherein the surface of protecting layer consisting of the base metal and positioned on the side of the backing metal is passivated, in a case where said first protecting layer consisting of the base metal is passivated. That is, the substrate material as a whole is immersed in the electroplating liquor and acts as a cathode body. The surface of a bearing-alloy layer and the surface of a protecting layer are brought into contact with the plating liquor, and the Bi-based overlay layer deposits only on the surface of a bearing-alloy layer. Contrary to this, in the conventional electroplating of a Bi-based overlay layer, Bi precipitates on the back surface of a cathode material during electroplating. The precipitated Bi then peels off, causing a surface roughening of the backing steel sheet.

A backing steel sheet, a plain bearing alloy layer bonded on the top surface of a backing steel sheet, and a Bi-based overlay layer deposited on the surface of the plain bearing alloy of the sliding member (6) according to the present invention are common to a conventional sliding member. The sliding member (6) according to the present invention is characterized in that: it comprises a first protecting layer formed on the back surface of backing steel sheet and consisting of noble metal, base metal or resin. The sliding member (6) is also characterized in that it is produced by any one of the methods (1) through (3) mentioned above. After electrolytic plating of a Bi-based overlay layer, the Bi-based overlay layer and the remaining protecting layer may be assembled in an actual machine. Even in this case, no problem occurs at all, because a constituent material of the Bi-based overlay layer neither substitutes for the first protecting layer nor deposits on the first protecting layer of the sliding member. In addition, the first protecting layer consisting of oxide or resin is essentially corrosion resistant in the plating liquor.

Effects of Invention

The present invention makes it possible to prevent a backing steel sheet from corrosion and surface roughening during electroplating of a Bi-based overlay layer in a plain bearing. Destruction and fatigue can therefore be prevented when a backing steel sheet is brought into repeated contact with the counterpart material.

EMBODIMENTS OF INVENTION

Figure 1:
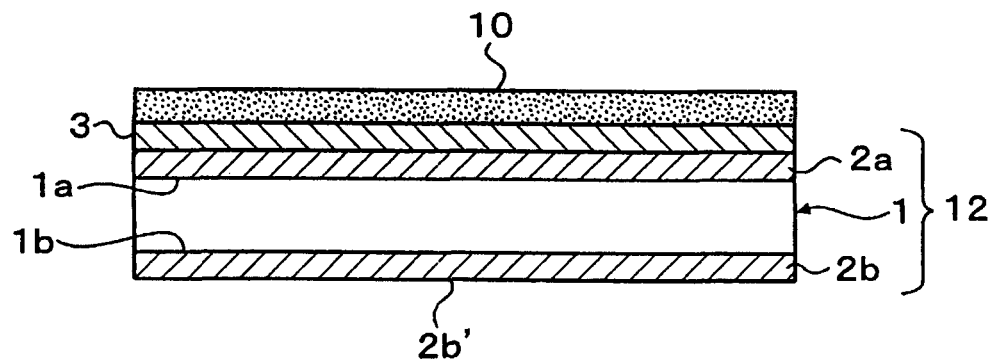
FIG. 1 A cross sectional view of a plain bearing according to an embodiment of the present invention. This illustration is referred to for describing a method for providing a noble-metal or oxide layer on both surfaces of a backing steel sheet.
Figure 2:
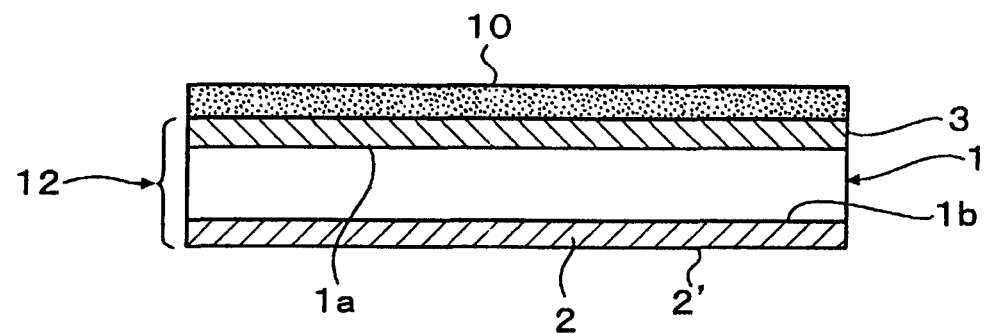
FIG. 2 A cross sectional view of a plain bearing according to an embodiment of the present invention. This illustration is referred to for describing a method for providing a noble-metal or oxide lay on the back surface of a backing steel sheet.
Figure 3:
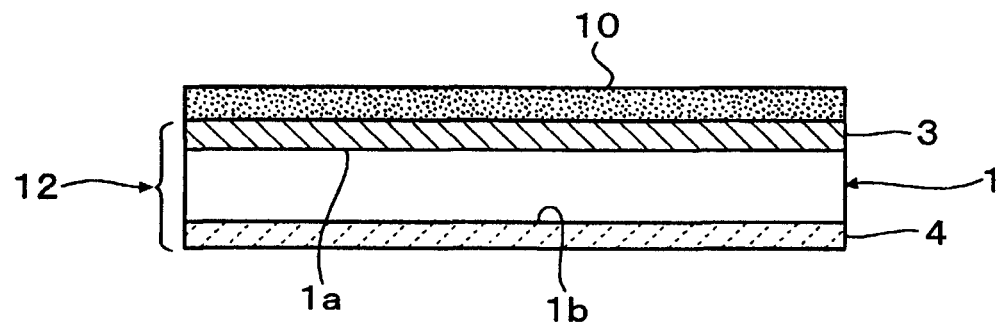
FIG. 3 A cross sectional view of a plain bearing according to an embodiment of the present invention. This illustration is referred to for describing a method for providing a resin coating on the back surface of a backing steel sheet.

FIGS. 1 through 3 show a cross section of a sliding member produced by the method according to the present invention. The reference numerals denote as follows: 1—a backing steel sheet (hereinafter referred to as "backing metal"); 1a—a top surface of the backing metal, i.e., a surface on the lining side; 1b—back surface, i.e., a surface on the side opposite the lining; 2—a protecting layer (hereinafter referred to as "a noble metal layer"); 3—a plain bearing alloy layer (hereinafter referred to as "lining"); and 10—a Bi-based overlay layer. In FIG. 1, prior to bonding the lining 3 on the surface 1a of a backing metal 1, the noble metal layers 2a and 2b are deposited on both the top surface 1a and the back surface 1b of a backing metal 1, by electroplating, sputtering, pressure-bonding, or the like. The thickness of layer 2a, 2b is preferably 0.2 to 10 μm, more preferably 0.5 to 3 μm. Subsequently, the lining 3 is deposited on the noble metal layer 2a on the top-surface 1a side of a backing metal. In this stage, a substrate material 12 of a sliding member is obtained.

Finally, the substrate material 12 of sliding member is connected to a cathode and is immersed entirely in a plating liquor, thereby depositing a Bi-based overlay layer 10 by electroplating. Since Bi of the Bi-based overlay 10 is base as compared with the metal of the noble metal layer 2, neither substitution nor precipitation occurs between the noble metal layer 2b and Bi (alloy). Specifically, although the noble metal layer 2b is lightly etched by plating liquor, electrolytic precipitation of Bi (alloy) does not occur. The noble metal layer 2a between the lining 3 and top surface (1a) of backing metal 1 does not participate in corrosion prevention of the back surface of a backing metal 1 but enhances adhesion between 3 and 1a.

Preferable conditions of Bi electroplating are as follows.
Alkanesulfonate 70 g/L
Bi ions 10 g/L
pH approximately 0
Temperature 25 degrees C.
Current Density 2 A/dm$^2$
Time 20 minutes In FIG. 2, a lining 3 is bonded directly to the top surface 1a of a backing metal 1. Subsequent to or prior to bonding of the lining, the noble metal layer 2' is deposited on the back side 1b of a backing metal by electroplating, sputtering, pressure-bonding or the like. A sliding member substrate material 12 is obtained in this stage. Subsequently, the substrate material 12 is connected to a cathode and is immersed entirely in a plating liquor, thereby depositing a Bi-based overlay layer 10 by electroplating. Since Bi of the Bi-based overlay 10 is more base as compared with the metal of the noble metal layer 2, neither substitution nor precipitation occurs between the noble metal layer 2 and Bi (alloy). That is, Bi (alloy) does not electrolytically deposit on the noble metal layer 2.

Such elements as Al, Ti, Cr and Ni are base metals as compared with Bi. Surfaces of these metals change to $Al_2O_3$, $TiO_2$, $Cr_2O_3$, NiO or the like and are thus passivated. Bi (alloy), therefore, does not electrolytically precipitate on the passivated surface. Thus, these base metals can be used for the layer 2 instead of the noble metal. A layer of these base metals is formed on a desired surface through vapor deposition of Al, Ti or the like, or vapor deposition or electroplating of Cr, Ni or the like. Passivation treatment is then carried out by a known method, such as anodizing of Al. In this case of Cr, Ti or Ni, heat treatment causes passivation. Passivation also occurs, when these metals are allowed to stand at room temperature for a few days, the so-called native oxide is formed. As a result, no artificial treatment is necessary. Since these oxides are electrically non conductive, these oxides and Bi (alloy) are not substituted with each other. Specifically, such substitution does not occur on the opposite side 2b of a backing metal. Bi (alloy) does not precipitate on the opposite side 2b. Among the oxides mentioned above, the oxides of stainless steel such as Fe—Cr, and of Al-based material are known as a passivation film component and attain stable protecting effect.

Referring to FIG. 3, a lining 3 is bonded to the top surface 1a of a backing metal 1. Subsequent to or prior to the bonding, a resin layer 4 having a thickness of preferably 1 to 500 μm, more preferably 2 to 100 μm, is bonded to the back surface 1b on the backing metal 1 mentioned above. Epoxy resin, polyimide resin, phenol resin and the like can be used as resin. The resin is applied and then baked to form a resin layer 4. A sliding member substrate material 12 is obtained in this stage. The substrate material 12 is subsequently connected to a cathode and its entire surface is immersed in the plating liquor, so as to have a Bi-based overlay layer 10 deposited by electroplating. Since resin is electrically non conductive, a substitution between the resin layer 4 and Bi (alloy) does not occur. Namely, Bi (alloy) does not electrolytically precipitate on the resin layer 4.

Next, the present invention is described in more detail with reference to experimental examples.

COMPARATIVE EXAMPLE

A 1.3-mm thick SPCC steel sheet was used as a backing metal 1 (FIG. 1), on which no noble metal layers 2a, 2b were deposited. A 0.2-mm thick Cu alloy layer (composition: Cu-5% Sn) as a lining 3 was bonded to the top surface side (1a) of the backing metal 1. The substrate material 12 was manufactured as described above and was connected to a cathode, and its entire surface was immersed in a Bi electroplating bath having a composition described above. A 7-μm thick Bi-based overlay layer was plated under the current condition described above. After plating, the surface of the backing metal's back side (1b) was inspected. Surface roughness was observed. Roughness Rz of the backing metal's back side surface (1b) was 25 μm.

Example 1

A 1.3-mm thick SPCC steel sheet was used as a backing metal 1 (FIG. 1). A 0.2-mm thick Cu alloy layer (composition: Cu-5% Sn) was used as a lining 3. First, the noble metal layers 2a, 2b are deposited on the both sides of a backing metal 1 by electroplating. 2-um thick Cu was deposited in a cyanate bath under a current density of 2 A/dm². Then, rinsing with water and drying were carried out. A lining 3 was subsequently bonded to the top surface side (1a) of a backing metal 1. The substrate material 12 was manufactured as described above and was connected to a cathode, and its entire surface was immersed in a Bi electroplating bath having a composition described above. A Bi-based overlay layer was plated to a thickness of 7 μm under the current condition described above. After plating, the surface of the backing metal's back side 1b was observed. The surface was virtually not different from the one which had undergone electroplating, with neither surface roughening nor Bi deposition being observed.

Example 2

In FIG. 2, the backing metal 1 and lining 3 were of the same types as in FIG. 1. The same type of Bi-based overlay layer 10 was deposited by electroplating. However, the noble metal layer 2 was deposited only on the back surface 1b of a backing metal 1. After plating, the surface of the backing metal's back side was observed. This surface was virtually not different from the one which had undergone electroplating, with neither surface roughening nor Bi deposition being observed.

Example 3

The same type of backing metal 1 and the same type of lining 3 were formed to provide a layer structure as shown in FIG. 1. However, a Cr layer 2 was deposited on a work piece by electroplating. An Ni layer 2 was deposited on another work piece. After the work pieces were allowed to stand at room temperature, the surface 2' was converted to $Cr_2O_3$ and NiO and thus passivated. Subsequently, a Bi-based overlay layer 10 was deposited by electroplating. After plating of the Bi-based overlay layer 10, the surface of the $Cr_2O_3$ layer and NiO layer 2' on the back side of a backing metal was observed. This surface turned out to be virtually not different from a surface obtained from electroplating and subsequent standing at room temperature. Neither surface roughening nor electrolytic deposition of Bi were observed.

Example 4

The backing metal 1, lining 3 and Bi-based overlay 10 were all of the same types as in FIG. 1. Instead of using noble metal layers 2a, 2b, a Cr layer 2 was deposited on a work piece. Also an Ni layer 2 was deposited on another work piece. These layers were electrolytically deposited on the both sides of a backing metal (electroplating). When the Cr or Ni layer 2b on the backing metal side was allowed to stand at room temperature, the surface of the Cr layer was converted to $Cr_2O_3$ and thus passivated, while the surface of the Ni layer was converted to NiO and thus passivated. The lining was sintered on the Cr or Ni layer 2a in a reducing protective sintering atmosphere. The $Cr_2O_3$ layer and NiO present on the Cr and Ni layers 2a were reduced to Cr and Ni, respectively, during sintering. After plating of the Bi-based overlay layer 10, the surfaces of the $Cr_2O_3$ layer and NiO layer 2' on the back side of a backing metal were observed. The surfaces turned out to be virtually not different from those obtained through electroplating and subsequent standing at room temperature. Neither surface roughening nor electrolytic deposition of Bi were observed.

Example 5

The backing metal 1 and the Bi-based overlay layer 10, which are the same as those in FIG. 1, as well as an epoxy resin layer 4 constructed a structure shown in FIG. 3. After applying a 3-μm thick epoxy resin layer 10, baking was carried out at 100 degrees C. After plating of the Bi-based overlay layer 10, the surfaces of the $Cr_2O_3$ layer and NiO layer 2' on the back side of a backing metal were observed. The surfaces were found to be virtually not different from a surface obtained through electroplating and subsequent standing at room temperature. Neither surface roughening nor electrolytic deposition of Bi were observed.

INDUSTRIAL APPLICABILITY

When a Bi-based overlay is deposited on backing steel sheet in a conventional production method of plain bearing, the performance of a backing steel sheet inevitably deteriorates. The present invention enables to prevent such performance deterioration and greatly contribute to industry.

The invention claimed is:

1. A method of producing a sliding member, said method comprises the steps of:
    bonding a plain bearing layer over a first surface of a backing steel sheet, opposite to a second surface of the backing steel sheet;
    subjecting the plain bearing layer and the first protecting layer defined below to an electroplating, thereby depositing a Bi based overlay layer on the plain bearing layer, but neither depositing Bi on nor roughening a first surface of the first protecting layer facing away from the backing steel sheet; and
    prior to the step of electroplating of the Bi-based overlay layer, said method further comprises a step of forming a first protecting layer on the second surface of the backing steel sheet, said first protecting layer consisting of a noble metal, wherein
    said electroplating comprises a step of immersing the whole of a substrate material comprising the backing steel sheet, the plain bearing layer, and the first protecting layer into a Bi-ion containing plating liquor, and
    the noble metal of the first protecting layer is electrochemically more noble than Bi.

2. The method according to claim 1, wherein said method consists of said bonding step, said forming of the first protecting layer step, and said electroplating step, and said substrate material consists of the backing steel sheet, the plain bearing layer and the first protecting layer.

3. The method according to claim 1, wherein the noble metal is Cu.

4. A method of producing a sliding member, said method comprises the steps of:
    bonding a plain bearing alloy layer over a first surface of a backing steel sheet, opposite to a second surface of the backing steel sheet;
    electroplating to subject the plain bearing alloy layer and the first protecting layer defined below to the electroplating, thereby depositing a Bi based overlay on the plain bearing alloy layer but not depositing Bi on the first protecting layer on a surface away from the backing steel sheet; and
    prior to the step of electroplating of the Bi-based overlay layer, said method further comprises the steps of forming a first protecting layer on the second surface of the backing steel sheet, said first protecting layer consisting of a noble metal; and forming a second protecting layer consisting of a noble metal on the first surface of the backing steel sheet, wherein
    said electroplating comprises a step of immersing the whole of a substrate material comprising the backing steel sheet, the plain bearing alloy layer, and the first and second protecting layers into a Bi plating liquor, and
    the noble metal of the first and second protecting layers is electrochemically more noble than Bi.

5. The method according to claim 4, wherein the noble metal is Cu.

6. A method of producing a sliding member, said method comprises the steps of:
    bonding a plain bearing alloy layer over a first surface of a backing steel sheet, opposite to a second surface of the backing steel sheet;
    electroplating to subject the plain bearing alloy layer and the first protecting layer defined below to the electroplating, thereby depositing a Bi based overlay on the plain bearing alloy layer, but not depositing Bi on the first protecting layer on a surface away from the backing steel sheet; and
    prior to the step of electroplating the Bi-based overlay layer, said method further comprises the steps of:
    forming a first protecting layer on the second surface of the backing steel sheet, said first protecting layer consisting of a noble metal; forming a second protecting layer consisting of a base metal on the first surface of the backing steel sheet;
    passivating a surface of the second protecting layer on a surface of the second protecting layer away from the backing steel sheet; and
    pickling the passivated surface of the second protecting layer, thereby removing passivated material prior to the step of electroplating,
    wherein said electroplating comprises a step of immersing the whole of a substrate material comprising the backing steel sheet, the plain bearing alloy layer, and the first and second protecting layers into a Bi plating liquor, and
    wherein the noble metal of the first protecting layer is electrochemically more noble than Bi, and the base metal of the second protecting layer is electrochemically less noble than Bi, capable of forming a passivated state on a surface thereof and selected from the group consisting of Al, Cr and Ni.

7. The method according to claim 6, wherein the noble metal is Cu.

8. The method according to claim 6, wherein the base metal is selected from the group consisting of Cr and Ni.

9. The method according to claim 6, wherein the base metal is Al and the passivation is carried out by anodizing.

* * * * *